United States Patent [19]
Gisler et al.

[11] Patent Number: 5,491,221
[45] Date of Patent: Feb. 13, 1996

[54] FIBER-REACTIVE COPPER-COMPLEX FORMAZAN COMPOUNDS WHICH CONTAIN A DIFLUOROPYRIMIDINYL GROUP

[75] Inventors: Markus Gisler, Rheinfelden, Switzerland; Roland Wald, Huningue, France

[73] Assignee: Sandoz Ltd., Basel, Switzerland

[21] Appl. No.: 247,154

[22] Filed: May 20, 1994

Related U.S. Application Data

[63] Continuation of Ser. No. 128,448, Sep. 28, 1993, abandoned, which is a continuation of Ser. No. 992,980, Dec. 18, 1992, abandoned.

[30] Foreign Application Priority Data

Dec. 20, 1991 [DE] Germany ................... 41 42 126.4

[51] Int. Cl.[6] ................... C09B 62/465; C09B 62/20; D06P 1/38
[52] U.S. Cl. ................... 534/618; 8/549
[58] Field of Search ................... 534/618; 8/549

[56] References Cited

U.S. PATENT DOCUMENTS

| | | | |
|---|---|---|---|
| 3,068,219 | 12/1962 | Beffa et al. | 534/618 |
| 3,565,881 | 2/1971 | Dussy et al. | 534/618 |
| 3,725,382 | 4/1973 | Grandjean | 534/618 |
| 4,024,123 | 5/1977 | Dussy et al. | 534/618 |

FOREIGN PATENT DOCUMENTS

| | | |
|---|---|---|
| 443163 | 8/1991 | European Pat. Off. . |
| 522339 | 1/1993 | European Pat. Off. . |

OTHER PUBLICATIONS

Derwent Abstract of EP 443,163 (Aug. 28, 1991).
Derwent Abstract of EP 522,339 (Jan. 13, 1993).

*Primary Examiner*—Johann Richter
*Assistant Examiner*—Fiona T. Powers
*Attorney, Agent, or Firm*—Robert S. Honor; Carl W. Battle; Hesna J. Pfeiffer

[57] ABSTRACT

Fiber-reactive formazan compounds, salts thereof or free acid forms thereof according to formula (I)

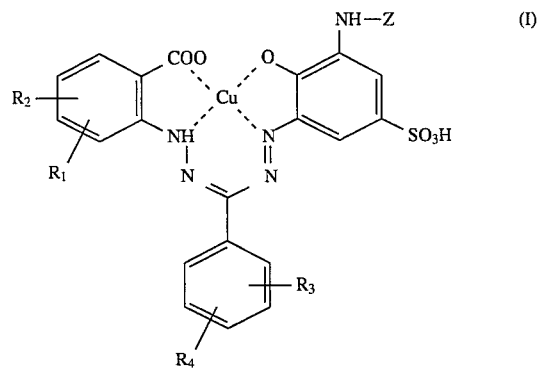

in which $R_1$ is hydrogen or —COOH, each of $R_2$ and $R_4$ is independently hydrogen, —COOH, —SO$_3$H, —NHCOCH$_3$, —NHCOCHY$_2$—CH$_2$Y$_1$, —NHCOCY$_2$=CH$_2$ or —NHCOCH$_2$Y$_1$, $R_3$ is hydrogen, halogen, $C_{1-4}$alkyl, $C_{1-4}$alkoxy, —COOH or —SO$_3$H, $Y_1$ is chlorine, bromine, —OSO$_3$H or —SSO$_3$H, $Y_2$ is hydrogen, chlorine or bromine, and Z is

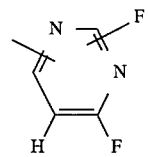

The compounds are particularly useful in dyeing or printing hydroxy-group containing or nitrogen-containing organic substrates, including leather, fiber materials, and textiles.

8 Claims, No Drawings

FIBRE-REACTIVE COPPER-COMPLEX FORMAZAN COMPOUNDS WHICH CONTAIN A DIFLUOROPYRIMIDINYL GROUP

This is a continuation of application Ser. No. 08/128,448 filed on 28 Sep. 1993, now abandoned, which in turn is a continuation appliaction of application Ser. No. 07/992,980 filed on 18 Dec. 1992 now abandoned.

This invention relates to fiber-reactive formazan compounds and a process for their preparation. These compounds are suitable for use as fiber-reactive dyestuffs in any conventional dyeing or printing processes.

More particularly, the invention provides compounds of formula I

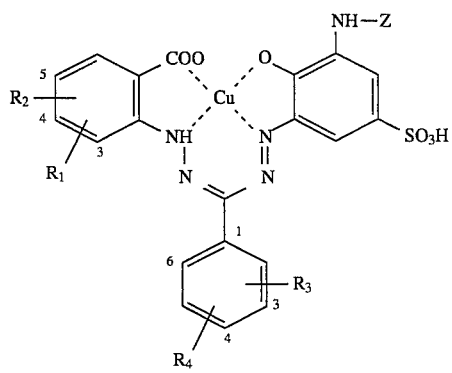

and salts thereof, or a mixture of such compounds or salts, in which $R_1$ is hydrogen or —COOH, each of $R_2$ and $R_4$ is independently hydrogen, —COOH, —SO$_3$H, —NH-COCH$_3$, —NHCOCHY$_2$—CH$_2$Y$_1$, —NHCOCY$_2$=CH$_2$ or —NHCOCH$_2$Y$_1$, $R_3$ is hydrogen, halogen, $C_{1-4}$alkyl, $C_{1-4}$alkoxy, —COOH or —SO$_3$H, $Y_1$ is chlorine, bromine, —OSO$_3$H or —SSO$_3$H, $Y_2$ is hydrogen, chlorine or bromine, and Z is

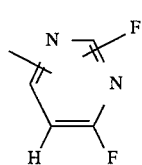

In the specification, any alkyl or alkoxy group present is linear or branched unless otherwise stated.

Any halogen as $R_3$ is preferably fluorine, chlorine or bromine, especially chlorine.

$R_1$ is preferably hydrogen.

$R_2$ is preferably $R_{2a}$, where $R_{2a}$ is hydrogen, —COOH or —SO$_3$H. Most preferably, $R_2$ is $R_{2b}$, where $R_{2b}$ is hydrogen or —SO$_3$H.

$R_4$ is preferably $R_{4a}$, where $R_{4a}$ is hydrogen, —COOH, —SO$_3$H, —NHCOCY$_2$=CH$_2$ or —NHCOCHY$_2$—CH$_2$Y$_1$. Most preferably, $R_4$ is $R_{4b}$, where $R_{4b}$ is hydrogen or —SO$_3$H.

$R_3$ is preferably $R_{3a}$, where $R_{3a}$ is hydrogen, methyl, methoxy, chlorine, —COOH or —SO$_3$H. More preferably, $R_3$ is $R_{3b}$, where $R_{3b}$ is hydrogen, methyl, —COOH or —SO$_3$H. Most preferably $R_3$ is hydrogen.

Preferred compounds of formula I correspond to formula Ia

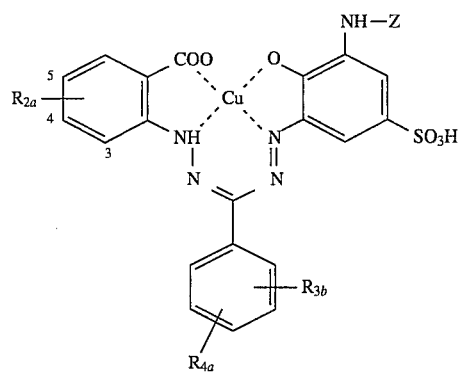

and salts thereof, in which $R_{2b}$, $R_{3b}$, $R_{4a}$ and Z are as defined above. Preferably, $R_{2a}$ is in the 3-, 4- or 5-position.

More preferred are compounds of formula Ia in which (1) $R_{2a}$ is $R_{2b}$, where $R_{2b}$ when —SO$_3$H is in the 4- or 5-position;

(2) $R_{4a}$ is $R_{4b}$;

(3) those of (1) or (2) in which $R_{3b}$ is hydrogen.

When a compound of formula I is in salt form, the cation associated with each sulpho, sulphato, thiosulphato and carboxy group that is in salt form is not critical and may be any one of those non-chromophoric cations conventional in the field of fiber-reactive dyes provided that the corresponding salts are water-soluble. Examples of such cations are alkali metal cations and unsubstituted and substituted ammonium cations, e.g.., lithium, sodium, potassium, ammonium, mono-, di-, tri- and tetramethylammonium, tri-ethylammonium and mono-, di- and tri-ethanolammonium.

The preferred cations are the alkali metal cations and ammonium, with sodium being the most preferred.

In a compound of formula I the cations of the sulpho and any sulphato, thiosulphato and carboxy groups can be the same or different, e.g., they can also be a mixture of the above mentioned cations meaning that the compound of formula I can be in a mixed salt form.

The invention further provides a process for the preparation of compounds according to formula I or mixtures thereof comprising reacting a compound of formula II,

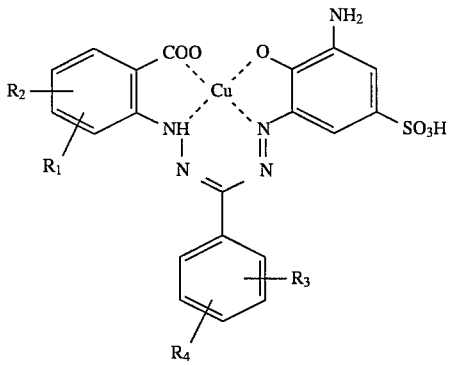

in which $R_1$ to $R_4$ are as defined above, or a salt thereof, with 2,4,6-trifluoropyrimidine.

This condensation reaction is suitably carried out at a temperature of from 0°–40° C. (preferably 0°–20° C.) and at a pH of from 6–9.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that the group Z

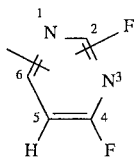

can occur in two isomeric forms, with the floating fluorine substituent in either the 2- or the 6-position. In general, it is preferred to use this mixture as it is without resorting to the isolation of a single isomer for use, but should this be desired it can be readily achieved by conventional methods.

The starting compounds of formula II are either known compounds or may be readily made from known materials using known methods.

The compounds of formula I and mixtures thereof are useful as fiber-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fiber-reactive dyestuff field. Preferably, for the compounds of formula I the exhaust dyeing method is used at temperatures within the range of 30° to 60° C., especially at 50° to 60° C.

The compounds of this invention have good compatibility with known fiber-reactive dyes; they may be applied alone or in combination with appropriate fibre-reactive dyestuffs of the same class having analogous dyeing properties such as common fastness properties and the extent of ability to exhaust from the dyebath onto the fiber. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

Furthermore, the dyeings and prints obtained with the compounds of formula I show notably high stability to acid hydrolysis, for example, a dyeing when contacted with dilute acetic acid, only shows a slight staining of the undyed accompanying fabric.

The invention is further illustrated with reference to the following non-limiting examples, in which all parts are expressed by weight unless otherwise stated and all temperatures are in degrees Centigrade.

Example 1

59.7 Parts of the formazan compound of the formula

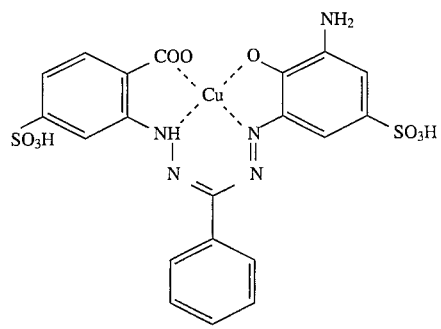

which has been prepared in accordance with conventional methods, are dissolved in 600 parts of water at pH 8 and 160 parts of 2,4,6-trifluoropyrimidine are poured into this solution. The reaction mixture is stirred overnight during which time the pH is maintained at 8 by the addition of sodium carbonate solution. After the reaction is complete, the resultant dyestuff is salted out using 60 parts of sodium chloride. The dyestuff which precipitates is filtered off and dried at 40°. It corresponds to the formula (which is in free acid form)

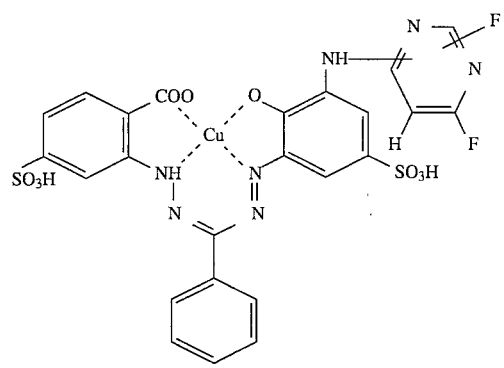

and dyes cotton in blue tones. These dyeings exhibit notably good light- and wet-fastness properties and they are resistant to oxidative influences.

Examples 2–15

By analogy with the method described in Example 1, using appropriate starting compounds, further compounds of formula I may be prepared which are listed in the following Table. In these compounds, the entity Z is

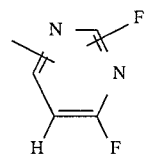

The compounds of Examples 2 to 15 may be applied to substrates which comprise cellulose fibres, and particularly to textile material comprising cotton, using the conventional exhaust dyeing method or conventional printing processes, where dyeings and prints in blue tones are obtained. These dyeings and prints on cotton show good light- and wet-fastness properties and are resistant to oxidative influences.

TABLE

| Ex. No. | R₁ (position) | R₂ (position) | R₃ (position) | R₄ (position) |
|---|---|---|---|---|
| 2 | H | —SO₃H (5) | H | H |
| 3 | H | H | —COOH (4) | H |
| 4 | H | H | —COOH (3) | H |
| 5 | —COOH (4) | H | —COOH (4) | H |
| 6 | —COOH (5) | H | " | H |
| 7 | —COOH (3) | H | " | H |
| 8 | —COOH (4) | —COOH (5) | H | H |
| 9 | H | —SO₃H (4) | —COOH (4) | H |
| 10 | H | —SO₃H (5) | " | H |
| 11 | H | —SO₃H (4) | —SO₃H (4) | —NHCOCH=CH₂ (3) |
| 12 | H | H | " | " |
| 13 | H | —SO₃H (5) | H | —NHCOCH₂CH₂OSO₃H (4) |
| 14 | H | H | H | " |
| 15 | H | —SO₃H (4) | —OCH₃ (4) | H |

By the preparation method described in Example 1, the compounds of Examples 1–15 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, the dyestuffs of Examples 1 to 15 (and the corresponding free acids and other salt forms) contain two isomeric compounds regarding the group Z

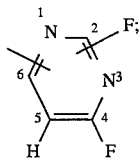

one compound in which the floating fluorine substituent on the pyrimidine ring is in the 2-position and the corresponding compound wherein it is in the 6-position, with the latter usually predominating. These isomeric mixtures may be used in conventional dyeing or printing processes; the isolation of a single isomer for use normally is unnecessary.

In the following examples, the application of compounds of this invention is illustrated.

Application Example A 0.3 Part of the dyestuff of Example 1 is dissolved in 300 parts of demineralised water and 15 parts of Glauber's salt (calcined) are added. The dyebath is heated to 50°, then 10 parts of cotton fabric (bleached) are added. After 30 minutes at 50°, a total of 6 parts of sodium carbonate (calcined) is added to the bath portionwise every 10 minutes applying quantities of 0.2, 0.6, 1.2 and finally 4.0 parts thereof. During the addition of sodium carbonate the temperature is kept at 50°. Subsequently, the dyebath is heated to 60° and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A blue cotton dyeing is obtained showing good light- and wet-fastness properties which is stable towards oxidative influences.

Application Example B

To a dyebath containing in 300 parts of demineralized water 10 parts of Glauber's salt (calcined), 10 parts of cotton fabric (bleached) are added. The bath is heated to 50° within 10 minutes, and 0.5 part of the dyestuff of Example 1 is added. After a further 30 minutes at 50°, 3 parts of sodium carbonate (calcined) are added. The dyebath is then heated to 60° and dyeing is continued at 60° for a further 45 minutes.

The dyed fabric is rinsed with running cold and then hot water and washed at the boil according to the method given in Application Example A. After rinsing and drying a blue cotton dyeing is obtained which has the same good fastness properties as indicated in Application Example A.

Similarly, the dyestuffs of Examples 2–15 or mixtures of the exemplified dyestuffs may be employed to dye cotton in accordance with the method described in Application Example A or B. The cotton dyeings thus obtained are blue and show good fastness properties.

Application Example C

A printing paste consisting of

| | |
|---|---|
| 40 parts | of the dyestuff of Example 1 |
| 100 parts | of urea |
| 350 parts | of water |
| 500 parts | of a 4% sodium alginate thickener and |
| 10 parts | of sodium bicarbonate |
| 1000 parts | in all | is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A blue print is obtained which has good general fastness properties.

Similarly, the dyestuffs of Examples 2 to 15 or mixtures of the exemplified dyestuffs may be employed to print cotton in accordance with the method given in Application Example C. All prints obtained are blue and show good fastness properties.

What is claimed is:

1. A compound of formula I

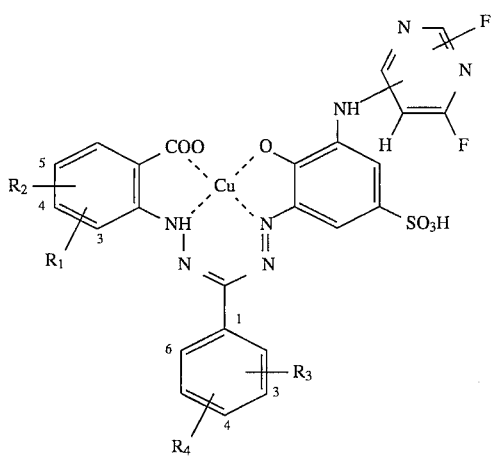

or a salt thereof, or a mixture of such compounds or salts, in which:

$R_1$ is hydrogen, $R_2$ is —$SO_3H$ in the 4 or 5 position, $R_3$ is hydrogen, $R_4$ is —NHCOCHY$_2$—CH$_2$Y$_1$, or —NHCOCY$_2$=CH$_2$, $Y_1$ is chlorine, bromine, —OSO$_3$H or —SSO$_3$H, $Y_2$ is hydrogen, chlorine or bromine.

2. A compound according to claim 1 wherein:

$Y_1$ is —OSO$_3$H.

3. A compound according to claim 1 wherein:

$Y_2$ is hydrogen.

4. A compound according to claim 2 wherein:

$Y_2$ is hydrogen.

5. A compound according to claim 1 wherein:

$R_2$ is in the 4 position.

6. A compound according to claim 1 wherein:

$R_2$ is in the 5 position.

7. A process for dyeing or printing a hydroxy group- or nitrogen-containing organic substrate, comprising applying to the substrate a compound according to claim 1 or a mixture of such compounds.

8. A process according to claim 7 wherein the substrate is a fiber material comprising natural or regerated cellulose.

* * * * *